(12) United States Patent
Foltz et al.

(10) Patent No.: US 7,537,478 B2
(45) Date of Patent: May 26, 2009

(54) WIRE MANAGEMENT COVER AND SYSTEM

(75) Inventors: Keith Richard Foltz, Duncannon, PA (US); Galen M. Martin, Camp Hill, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/779,555

(22) Filed: Jul. 18, 2007

(65) Prior Publication Data

US 2009/0020309 A1    Jan. 22, 2009

(51) Int. Cl.
*H01R 13/58* (2006.01)
(52) U.S. Cl. ...................................... 439/468; 439/466
(58) Field of Classification Search ................ 439/456, 439/459, 466, 468
See application file for complete search history.

(56) References Cited

U.S. PATENT DOCUMENTS

| | | | | | |
|---|---|---|---|---|---|
| 3,920,306 | A | * | 11/1975 | Barnett et al. | 439/459 |
| 5,266,740 | A | * | 11/1993 | Hsu | 174/72 C |
| 5,315,062 | A | * | 5/1994 | Hoshino | 439/446 |
| 5,391,092 | A | * | 2/1995 | Sumida | 439/470 |
| 5,586,916 | A | * | 12/1996 | Shinji et al. | 439/752 |
| 5,688,144 | A | * | 11/1997 | Kosuge | 439/596 |
| 6,203,362 | B1 | * | 3/2001 | Tsuji | 439/470 |
| 6,773,296 | B2 | * | 8/2004 | Kihira et al. | 439/445 |
| 6,962,504 | B2 | * | 11/2005 | Fukui et al. | 439/466 |

* cited by examiner

*Primary Examiner*—Thanh-Tam T Le

(57) ABSTRACT

A wire management cover having a cover body configured to detachably engage a connector and having an opening configured to allow passage of one or more wires. The cover includes a wire management portion hingedly attached to the cover body. The wire management portion has a plurality of channels, each channel configured to receive at least one of the one or more wires. The wire management portion is capable of latching engagement with the cover body. The cover body includes features permitting orientation of the cover in a plurality of directions with respect to the connector.

16 Claims, 8 Drawing Sheets

WIRE MANAGEMENT COVER AND SYSTEM

FIELD OF THE INVENTION

The present invention is directed to an electrical connector system, and more specifically to a wire management system for an electrical connector having multiple connection directions and/or orientations.

BACKGROUND OF THE INVENTION

Connectors are required to provide electrical power or electrical or electronic control signals between components, such as computers, printers, auxiliary hardware, etc. Often, these connections are required in less than optimum areas and require protection from shorts, damage, and other obstacles that may interfere with the transmission of the power or control signals. It is therefore desirable for the connectors to provide support, protection and direction/orientation to the wires and other materials transmitting the power or data.

Connector systems, including automotive connectors systems, often require that wires be routed in different directions and/or with differing orientation depending on connector location and wire routing within the vehicle. An example of a known system is shown in FIGS. 1 and 2, wherein a connector system 100 utilizes a wire cover 101 to engage connector 103. FIG. 1 shows the connector 103 and wire cover 101 in a disengaged position and FIG. 2 shows the connector 103 and the wire cover 101 in an engaged position. As shown in FIGS. 1 and 2, the wire cover 101 permits routing of the wires in a single direction, wherein alternate wiring directions, when desired, would require a wire cover 101 configured differently. Specifically, accommodating these various routings often require tooling and molding several different wire covers that mate to the connector but have direct wire routing directions. The single direction routing wire covers cause added expense to tool, store and maintain these multiple part options. The known wire cover systems are typically shipped separately or as a kit. In either case, a customer must assemble the wire cover onto the connector after inserting the contact wires, causing an added expense for the customer to assemble them.

What is needed is a connector system that includes a unitary wire cover allowing routing of wires in a plurality of directions and that may be assembled prior to shipping.

SUMMARY OF THE INVENTION

A first aspect of the present disclosure includes a wire management cover having a cover body configured to detachably engage a connector and having an opening configured to allow passage of one or more wires. The cover includes a wire management portion hingedly attached to the cover body. The wire management portion has a plurality of channels, each channel configured to receive at least one of the one or more wires. The wire management portion is capable of latching engagement with the cover body. The cover body includes features permitting orientation of the cover in a plurality of directions with respect to the connector.

Another aspect of the present disclosure includes a connector system including an electrical connector and a wire management cover. The wire management cover is detachably engaged to the electrical connector. The wire management cover includes a cover body configured to detachably engage the connector and having an opening configured to allow passage of one or more wires. The cover includes a wire management portion hingedly attached to the cover body. The wire management portion includes a plurality of channels, where each channel is configured to receive at least one of the one or more wires. The wire management portion is capable of latching engagement with the cover body. The cover body includes features permitting orientation of the cover in a plurality of directions with respect to the connector.

Another aspect of the present disclosure includes a connector kit having an electrical connector and a wire management cover arranged in one of an engaged arrangement or a separated arrangement. The wire management cover is capable of detachable engagement to the electrical connector. The wire management cover includes a cover body configured to detachably engage the connector and having an opening configured to allow passage of one or more wires. The cover includes a wire management portion hingedly attached to the cover body. The wire management portion includes a plurality of channels, where each channel is configured to receive at least one of the one or more wires. The wire management portion is capable of latching engagement with the cover body. The cover body includes features permitting orientation of the cover in a plurality of directions with respect to the connector.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
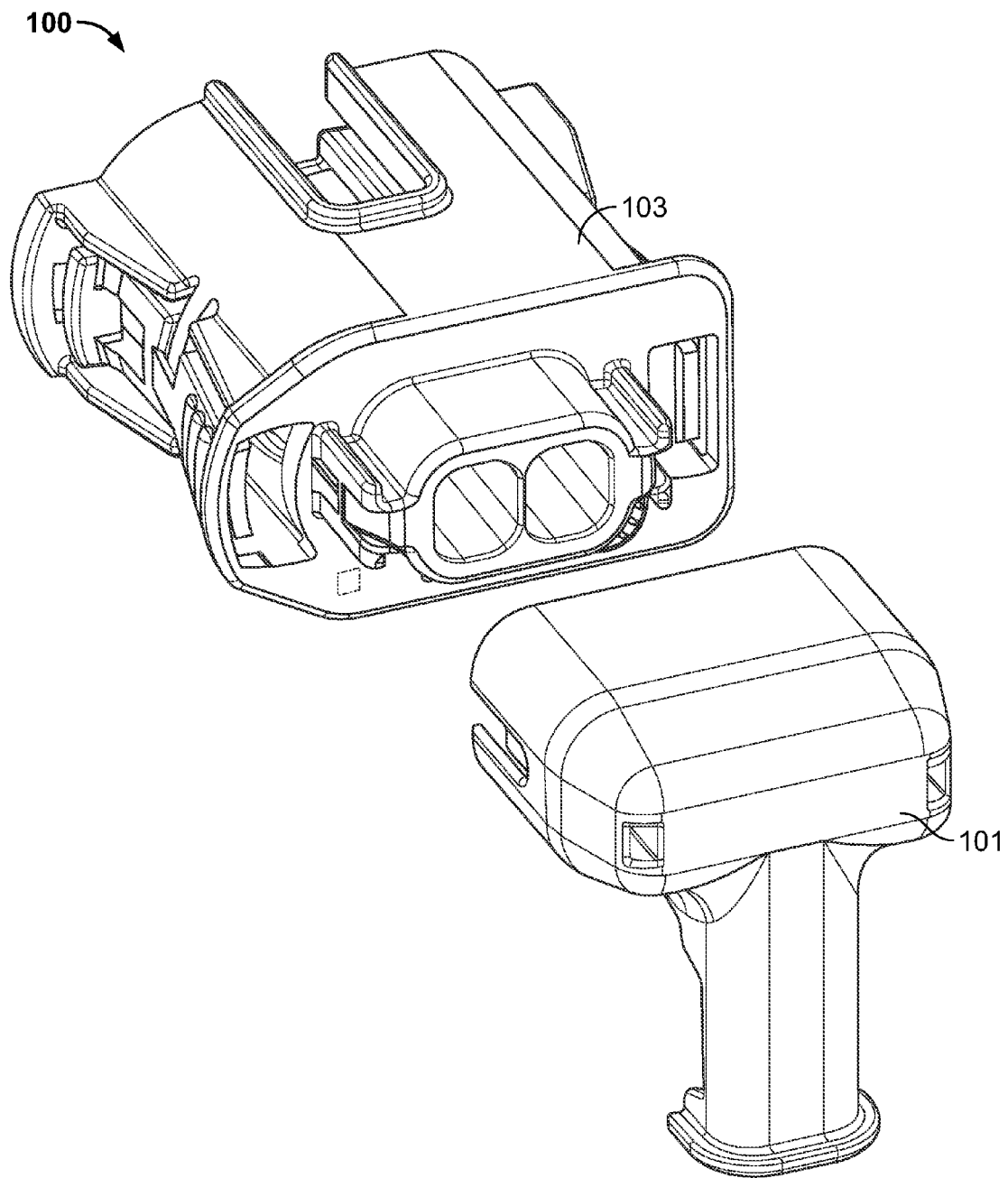
FIGS. 1 and 2 show a known connector system having a wire cover.
Figure 2:
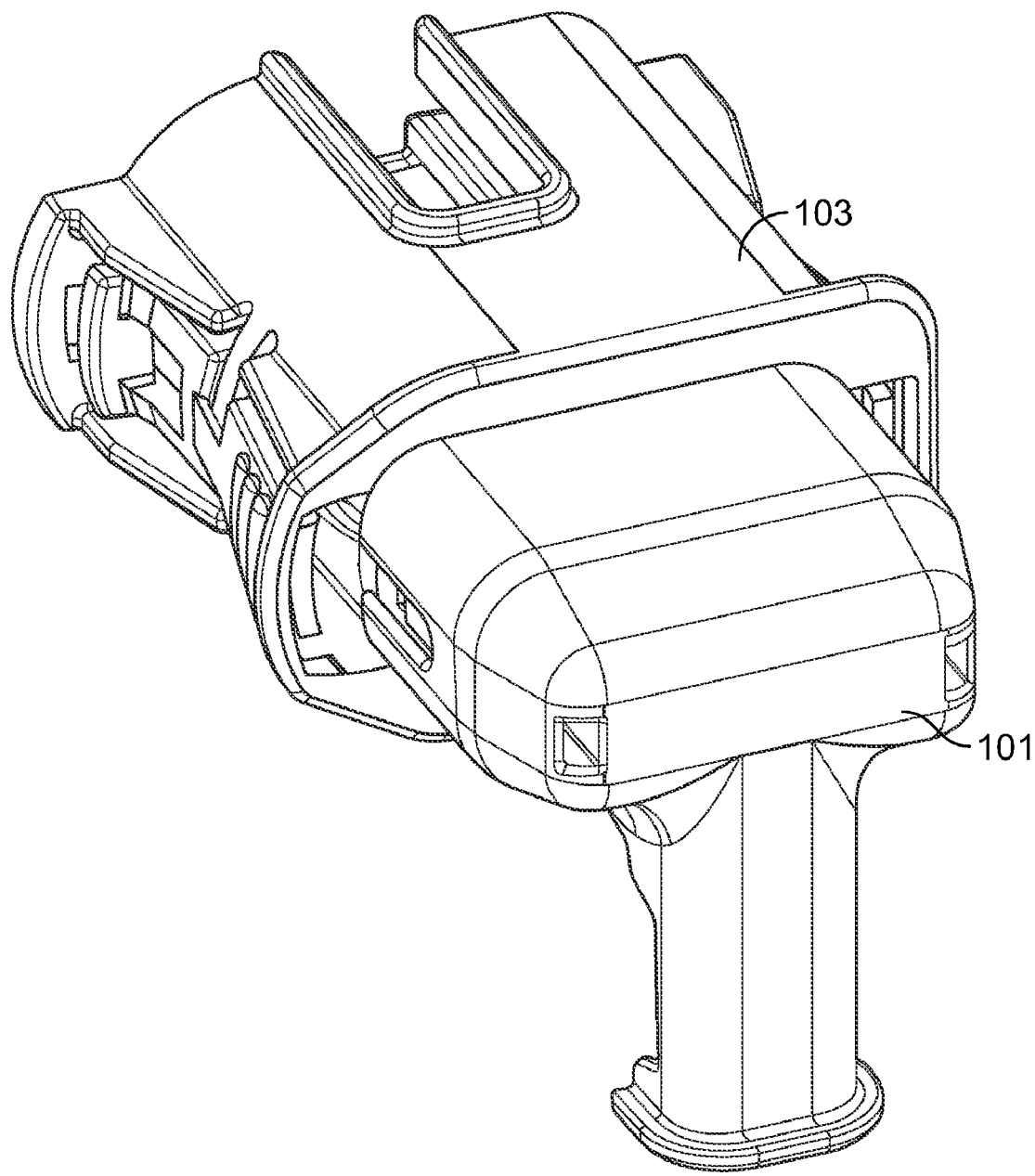
Figure 3:
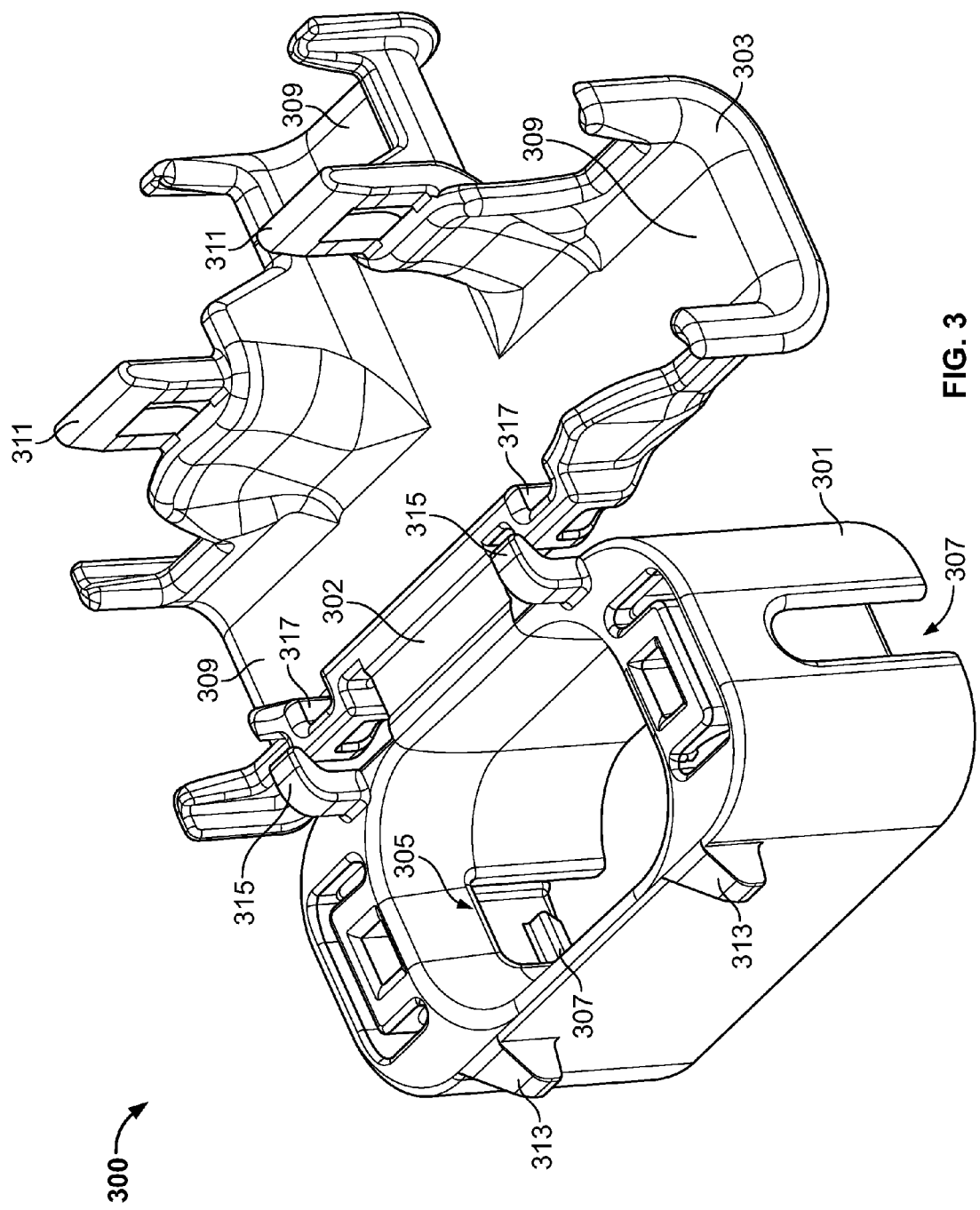
FIG. 3 shows a perspective view of a wire management cover according to an embodiment of the disclosure.

FIG. 3 shows a wire management cover 300 according to an embodiment of the disclosure. The wire management cover 300 includes a cover body 301 and a wire management portion 303 hingedly attached thereto. The cover body 301 and wire management portion 303 include a hinge 302 therebetween. The wire management portion 303 and the cover body 301 are preferably a unitary component, wherein the hinge 302 is preferably a living hinge, mechanical hinge or similar arrangement. In the embodiment shown the hinge 302 is a living hinge, wherein hinge 302 is unitary with cover body 301 and wire management portion 303. The cover body 301 includes an opening 305, which permits the passage of one or more wires to the terminal. The cover body 301 further includes connector features 307 configured to engage a connector 103 (see e.g., FIGS. 4-5). The features 307 may include grooves, latches, openings, slots, protrusions or any other feature suitable for engaging the connector 103. The features 307 are preferably configured to permit orientation of the cover body 301 in a plurality of directions with respect to connector 103. For example, while not being so limited, the cover body 301 may engage in a first position (see e.g., FIG. 5), and a second position, rotated 180° about a longitudinal axis of connector 103 from the first position (see e.g., FIG. 7). The wire management portion 303 includes a plurality of channels 309. The channels 309 are configured to receive one or more wires or other similar electrical devices. The channels 309 may be configured at any angle to the opening 305, provided that the angle between the opening 305 and channel 309 provides the installed wire (not shown) with a bend or joggle sufficient to provide strain relief and routing of the wire in the desired direction. The wire management portion 303 includes a pair of latch members 311 configured to engage latch features 313 upon hinged rotation of the wire management portion 303 into engagement with the cover body 301 (see e.g., FIG. 6). The hinged rotation is directed about hinge 302 via alignment members 315. The invention is not limited to arrangements having alignment members 315 and may engage the cover body 301 without devices for alignment. As shown in FIG. 3, alignment members 315 engage corresponding alignment slots 317, which guide the wire management portion 303 during rotation of the wire management portion 303 into the engaged position with the cover body 301.

Figure 4:
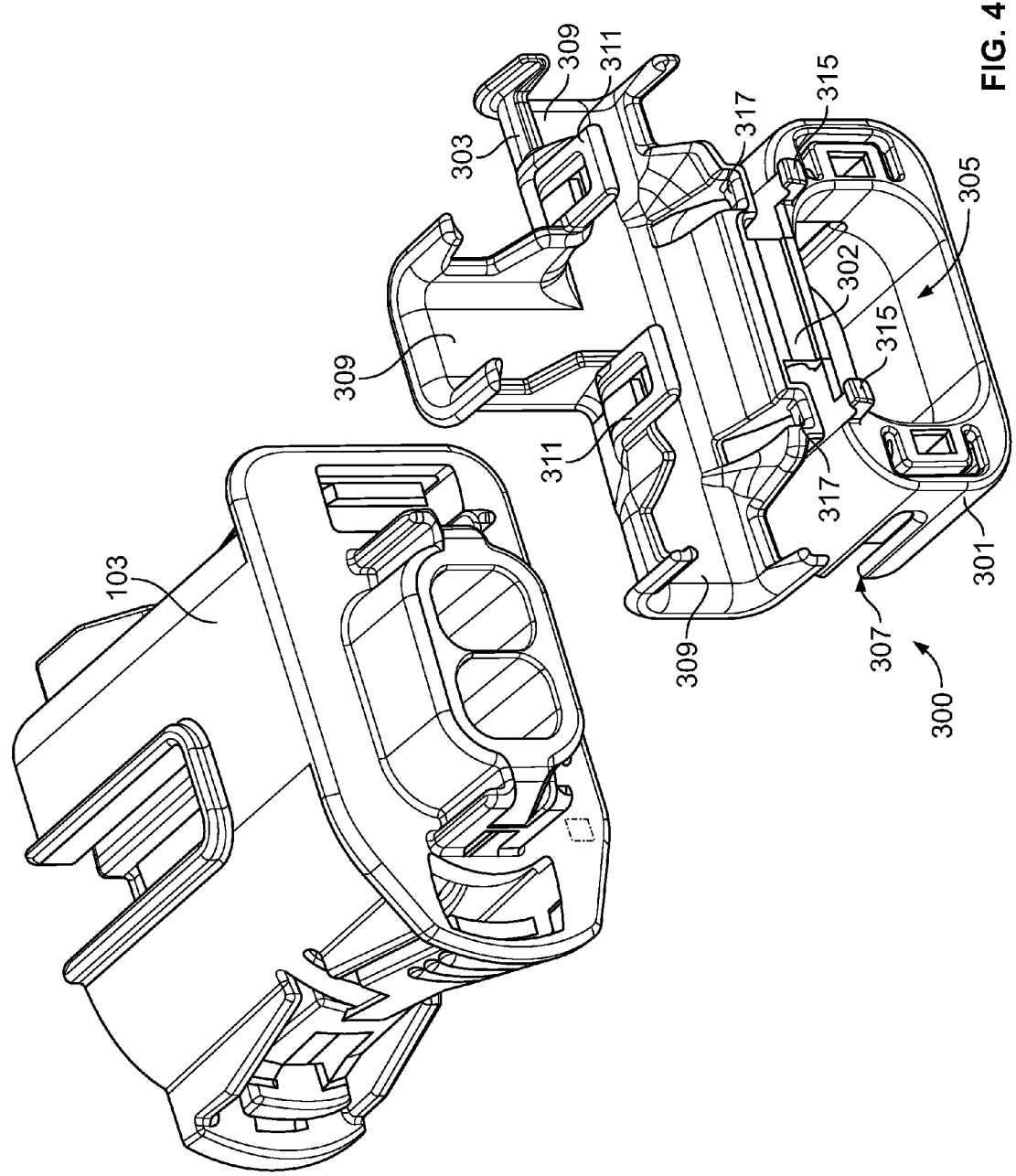
FIG. 4 shows a perspective view of a wire management cover and connector system according to an embodiment of the disclosure.

FIG. 4 illustrates a connector 103 and wire management cover 300 system wherein the connector and wire management cover are separate from one another. As described above with respect to FIG. 3, the wire management cover 300 includes features 307, which correspond to features of connector 103 to provide detachable engagement. The wire management portion 303 is in an open position, wherein wires or other devices may be inserted into opening 305. Connector 103 is not limited to the structure shown and may include any connector structure capable of receiving wires or similar electrical devices. The geometry of connector 103 is not particularly limited and may include any geometry that may have a corresponding, mating cover body 301.

Figure 5:
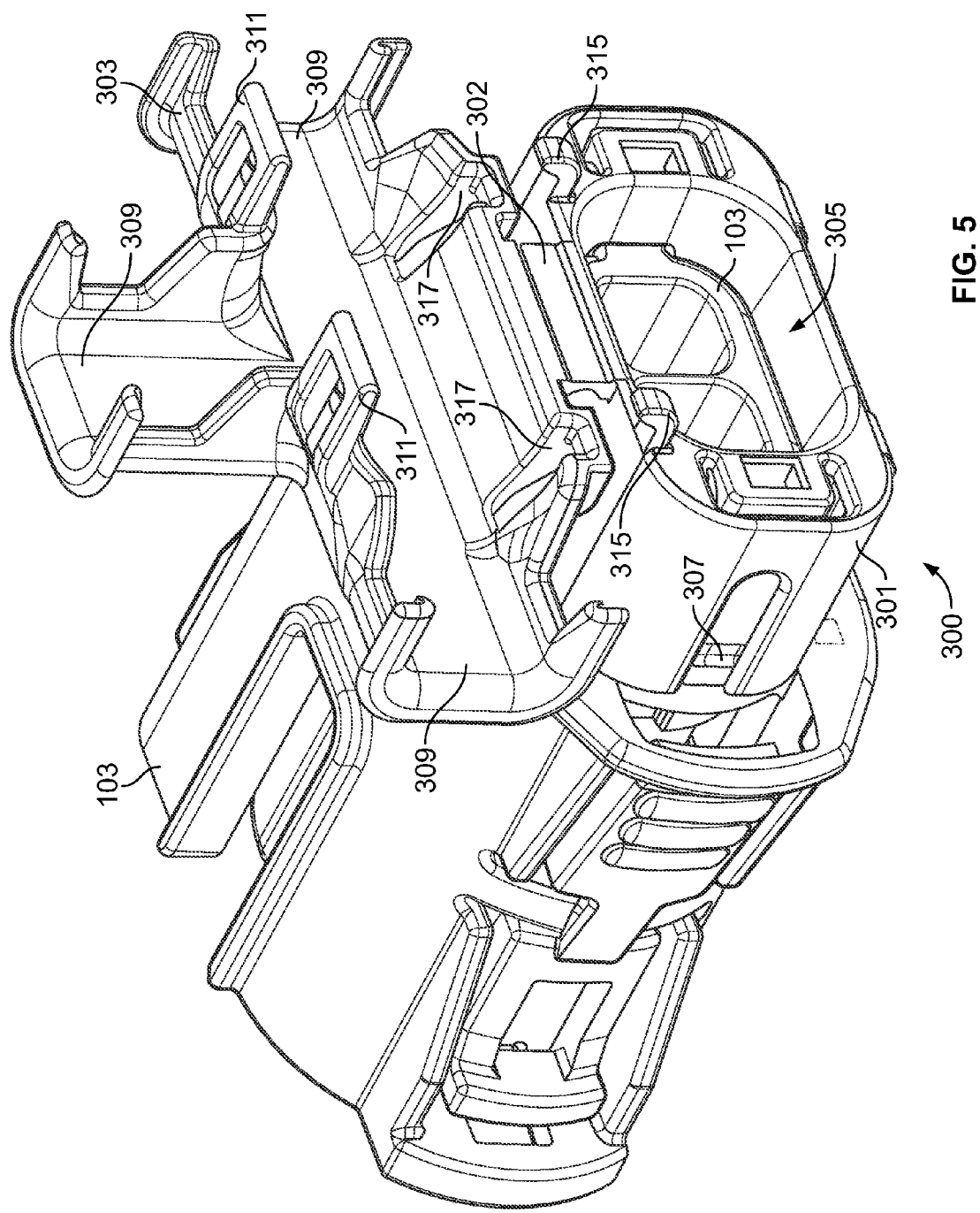
FIG. 5 shows a perspective view of a wire management cover and connector system with the cover and connector engaged according to an embodiment of the disclosure.

FIG. 5 illustrates the connector 103 and wire management cover 300 system of FIG. 4, wherein the connector and wire management cover are engaged with one another. As discussed above features 307 engage corresponding features on connector 103. As shown in FIG. 5, when engaged and in the open position, a portion of connector 103 is accessible via opening 305. The access via opening 305 is sufficient to permit the insertion of wires or other electrical devices into connector 103.

Figure 6:
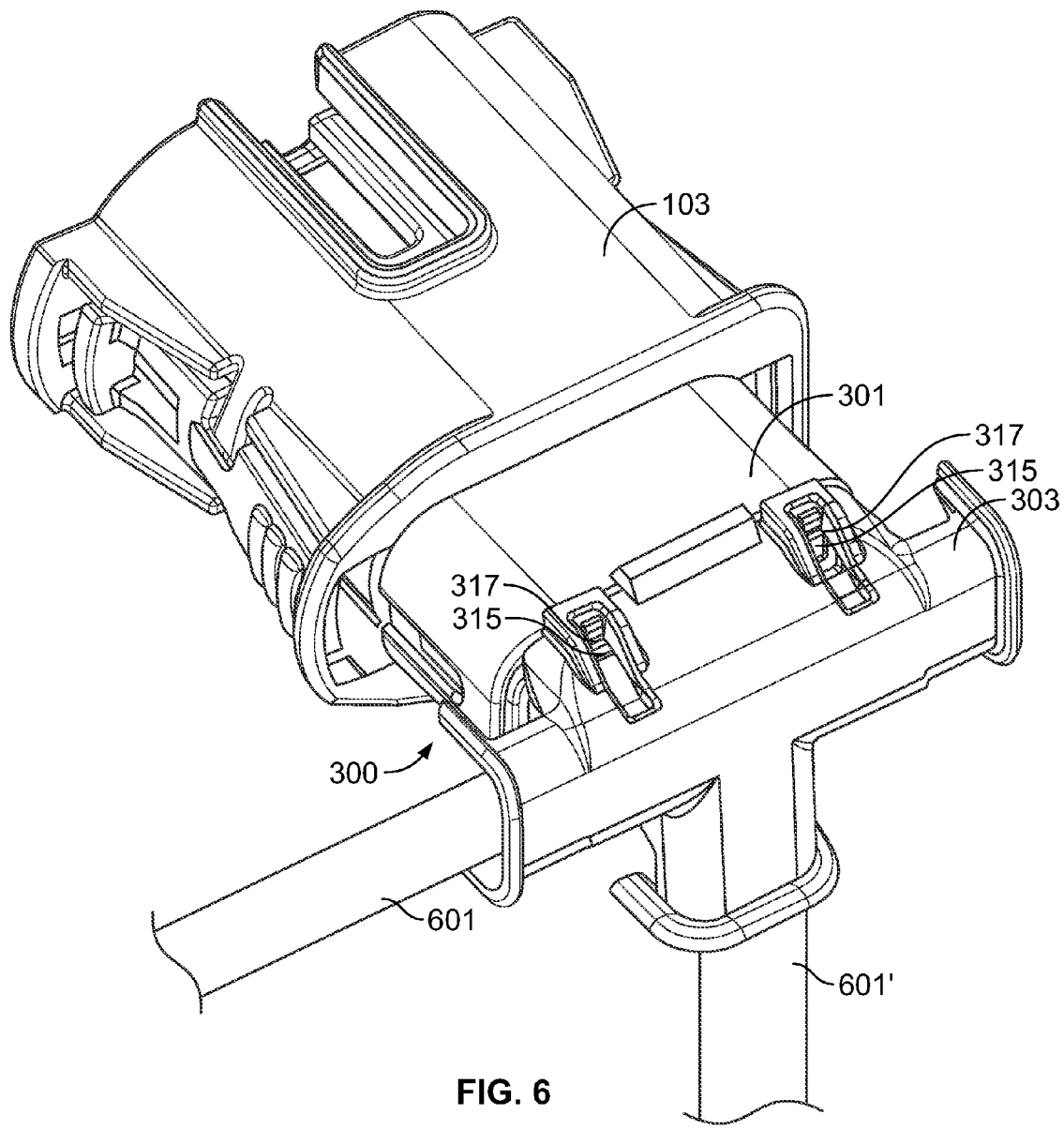
FIG. 6 shows a perspective view of a wire management cover and connector system of FIG. 5 with the wire management cover in the closed position.

FIG. 6 illustrates the connector 103 and wire management cover 300 system of FIG. 5, wherein the connector and wire management cover are engaged with one another and wire management portion 303 is in the closed position. As shown, wire management portion 303 is engaged with cover body 301, wherein the pair of latch members 311 are engaged with latch features 313 (not shown in FIG. 6) engaging the wire management portion 303 with the cover body 301. In addition, FIG. 6 illustrates the connector 103 and wire management cover 300 system includes a first wire 601 and a second wire 601' oriented perpendicularly to the connector 103 and at a 90° orientation to one another. To install one or more wires 601, 601' into the engaged cover 300 and connector 103 system, the wire 601, 601' is first directed into opening 305 when the wire management portion 303 is in the open position (see e.g., FIG. 5). The wire or wires 601, 601' are then advanced sufficiently to engage the connector 103 and provide electrical communication therewith. The wire or wires 601, 601' are then bent, joggled or otherwise oriented into a direction corresponding to the desired orientation of the wire or wires 601, 601'. The orientation of the wires 601, 601' correspond to one of the channels 309. Once the wire or wires 601, 601' have been oriented, the wire management portion 303 is hingedly rotated into a closed position. Once in the closed position, the wire or wires 601, 601' are disposed within channels 309 of wire management portion 303 and provide the wires with the desired orientation and strain relief. The wire management portion 303, as shown in FIG. 6, permits separate and independent orientation (i.e., routing orientations) of up to three wire orientations and/or directions, wherein one, two, three or more wires 601, 601' may be in communication with connector 103. Unused channels 309 may be allowed to remain vacant, or may be filled with a plug, potting material or other filler material or device. While perpendicular orientations with respect to opening 305 (shown in FIG. 5) are utilized to direct the wires in the three directions shown in FIG. 6, the orientations are not so limited and may include any angular orientation desirable for wire management, strain relief or other purposes. In addition, the wire management cover 300 may configured with any number of wire orientations and/or directions, including less than three and greater three orientations and/or directions.

Figure 7:
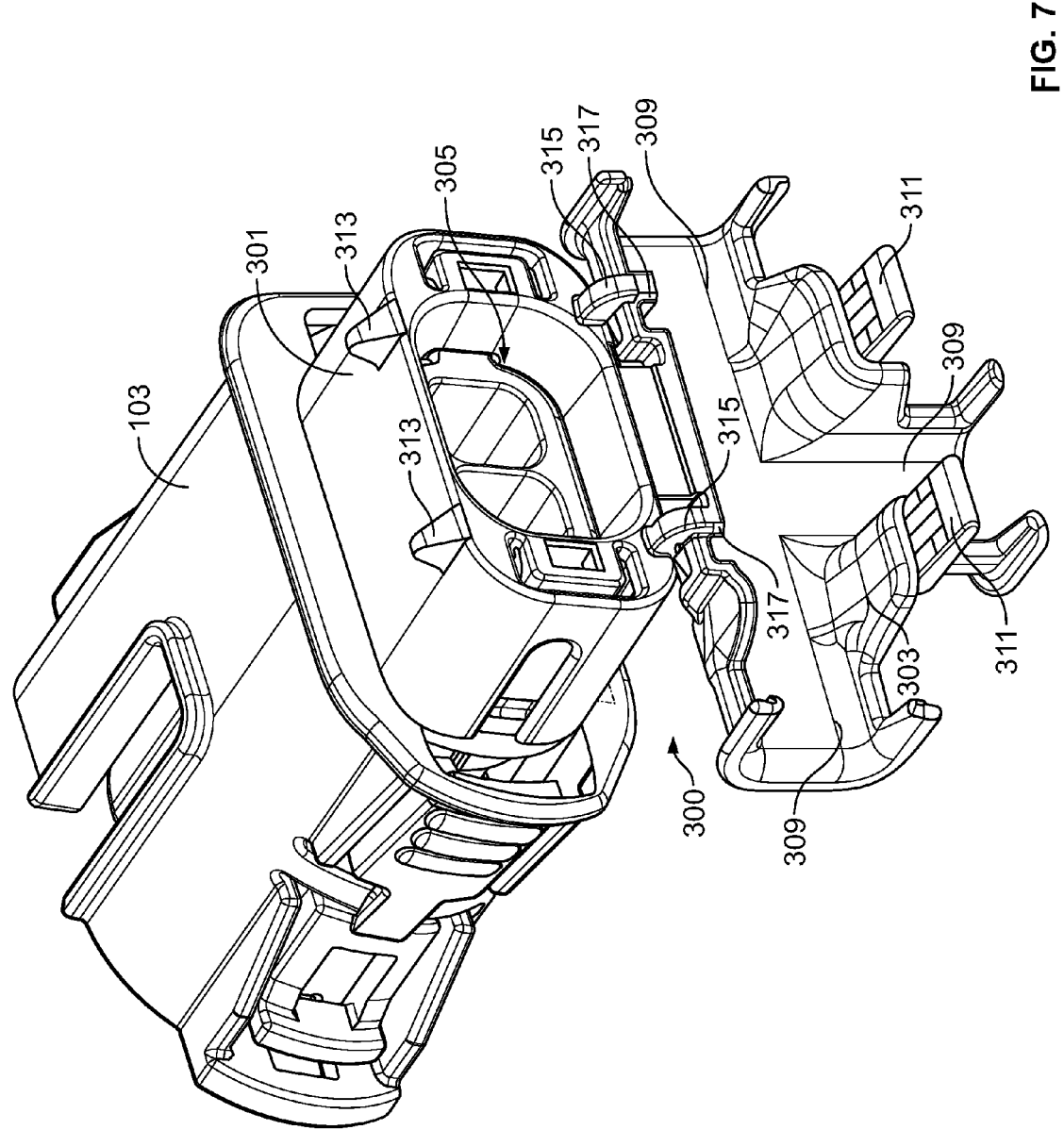
FIG. 7 shows a perspective view of a wire management cover and connector system with the cover and connector engaged according to another embodiment of the disclosure.

FIG. 7 illustrates the connector 103 and wire management cover 300 system of FIG. 4, wherein the connector and wire management cover are engaged with one another and wire management cover 300 is oriented at rotation orientation of 180° from the wire management cover 300 shown in FIG. 5 about a longitudinal axis of connector 103. As shown in FIG. 7, when engaged and in the open position, a portion of connector 103 is accessible via opening 305. The access via opening 305 is sufficient to permit the insertion of wires or other electrical devices into connector 103.

Figure 8:
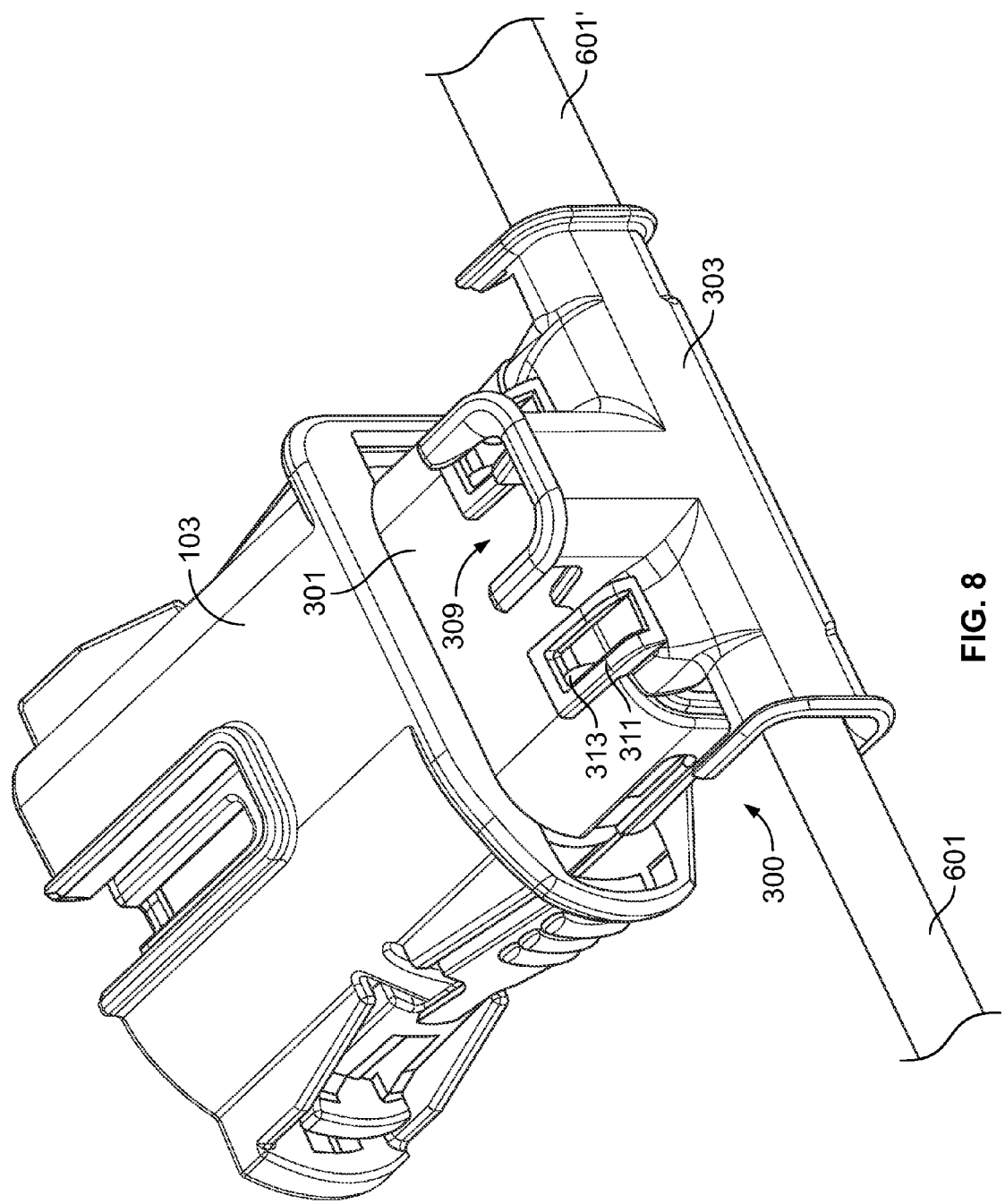
FIG. 8 shows a perspective top view of the wire management cover and connector system of FIG. 7 with the wire management cover in the closed position.

FIG. 8 illustrates the connector 103 and wire management cover 300 system of FIG. 7, wherein the connector and wire management cover are engaged with one another and wire management portion 303 is in the closed position. In addition, FIG. 8 illustrates the connector 103 and wire management cover 300 system including a first wire 601 and a second wire 601' oriented perpendicularly to the connector 103 and at a 180° orientation to one another.

Another embodiment of the present disclosure includes kits including systems or partial systems desirable for use in a plurality of applications. One kit according to an embodiment of the present disclosure includes a connector 103 and a wire management cover 300 in an open position, substantially as shown in FIG. 4. In this embodiment, the kit may be utilized to affix to an electrical system, wherein identical kits may provide for orientation of the wire management cover 300 in a plurality of directions, including a first direction and a second direction 180° from the first direction. In addition, separated components do not require disassembly of the wire connector and cover prior to configuring in the desired direction/orientation. In addition to the above kit, the connector 103 and the wire management cover 300 may be provided separately.

Another kit according to an embodiment of the present disclosure includes a wire management cover 300 engaged with a connector 103, wherein the wire management portion 303 is in an open position (see e.g., FIG. 5). In this arrangement, the open wire management portion 303 allows quick and easy configuration of the wires into a plurality of orientations. The compact design provides for easy shipping, which the wire management cover 300 remains removable from the connector 103 in order to provide different orientations of the wire management cover 300 with respect to the connector 103.

Another kit according to an embodiment of the present disclosure includes a wire management cover 300 engaged with a connector 103, wherein the wire management cover 300 is in a closed position. In this arrangement, the closed connector allows efficient packing for transportation and storage.

The disclosure is not limited to the above configurations of kits and may include any arrangement of engagement/disengagement and/or open or closed positioning that provides efficient packing, storage and ease of use for the installer of the wire management cover 300.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A wire management cover comprising:
    a cover body configured to detachably engage an electrical connector and having an opening which extends through the cover body, the opening configured to allow passage of one or more wires into a portion of the electrical connector;
    a wire management portion hingedly attached to the cover body, the wire management portion having at least three channels, each channel extending through a wall of the wire management portion and configured to receive at least one of the one or more wires, the wire management portion being capable of latching engagement with the cover body;
    wherein the cover body includes features permitting orientation of the cover in a plurality of directions with respect to the electrical connector and the opening and each channel are positioned such that upon insertion of at least one of the one or more wires through the opening and hingedly moving the wire management portion about the cover body, the at least one of the one or more wires is bent by the cover body to provide strain relief thereto; and
    wherein the channels are perpendicular to each other.

2. The cover of claim 1, wherein the wire management portion is hingedly attached to the cover body by a living hinge.

3. The cover of claim 1, further comprising a wire management portion alignment member on at least one of the wire management portion and the cover body.

4. The cover of claim 1, wherein the latching engagement includes a latch having a latch member and a latch feature that disengagably engage at least one end of the wire management portion to the cover body.

5. The cover of claim 1, wherein the features permit orientation of the body cover in a first direction and in a direction rotationally 180° from the first direction.

6. A connector system comprising:
    an electrical connector;
    a wire management cover detachably engaged to the electrical connector, the wire management cover comprising:
        a cover body configured to detachably engage the electrical connector and having an opening which extends through the cover body, the opening configured to allow passage of one or more wires into a portion of the electrical connector;
        a wire management portion hingedly attached to the cover body, the wire management portion having at least three channels, each channel extending through a wall of the wire management portion and configured to receive at least one of the one or more wires, the wire management portion being capable of latching engagement with the cover body;
        wherein the cover body includes features permitting orientation of the cover in a plurality of directions with respect to the electrical connector and the opening and each channel are positioned such that upon insertion of at least one of the one or more wires through the opening and hingedly moving the wire management portion about the cover body, the at least one of the one or more wires is bent by the cover body to provide strain relief thereto; and
        wherein the channels are perpendicular to each other.

7. The system of claim 6, wherein the wire management portion is hingedly attached to the cover body by a living hinge.

8. The system of claim 6, further comprising a wire management portion alignment member on at least one of the wire management portion and the cover body.

9. The system of claim 6, wherein the latching engagement includes a latch having a latch member and a latch feature that disengagably engage at least one end of the wire management portion to the cover body.

10. The system of claim 6, wherein the features permit orientation of the cover body in a first direction and in a direction rotationally 180° from the first direction.

11. A connector kit comprising:
    an electrical connector;
    a wire management cover capable of engagement with the electrical connector, the wire management cover and electrical connector being arranged in one of an engaged arrangement or a separated arrangement, the wire management cover comprising:
        a cover body configured to detachably engage the electrical connector and having an opening which extends through the cover body, the opening configured to allow passage of one or more wires into a portion of the electrical connector;
        a wire management portion hingedly attached to the cover body, the wire management portion having at least three channels, each channel extending through a wall of the wire management portion and configured to receive at least one of the one or more wires, the wire management portion being capable of latching engagement with the cover body;
        wherein the cover body includes features permitting orientation of the cover in a plurality of directions with respect to the electrical connector; and
        wherein the channels are perpendicular to each other.

12. The kit of claim 11, wherein the electrical connector and cover are detachably engaged.

13. The kit of claim 12, wherein the wire management portion is in a closed position.

14. The kit of claim 11, wherein the wire management portion is in a closed position.

15. The kit of claim 11, wherein the wire management portion is in an open position.

16. The kit of claim 11, wherein the features permit orientation of the cover body in a first direction and in a direction rotationally 180° from the first direction.

* * * * *